United States Patent [19]

Weill

[11] 4,059,884
[45] Nov. 29, 1977

[54] WEAR PART

[76] Inventor: Theodore C. Weill, 110 Carol Circle, Tylertown, Miss. 39667

[21] Appl. No.: 614,494

[22] Filed: Sept. 18, 1975

[51] Int. Cl.² .................. B23P 7/00; B22P 19/10
[52] U.S. Cl. .................. 29/401 E; 144/162 R; 76/101 A; 228/119; 228/165; 228/174
[58] Field of Search .......... 29/420, 420.5, DIG. 31, 29/530, 401; 172/699, 713, 719, 747; 37/142 R; 76/101 A, DIG. 11; 144/162 R, 218 US, 230 US; 228/165, 174, 119

[56] References Cited

U.S. PATENT DOCUMENTS

| 1,148,597 | 8/1915 | Lewis | 144/230 |
|---|---|---|---|
| 1,322,245 | 11/1919 | Klassen | 29/401 |
| 1,397,167 | 11/1921 | Hopper | 29/401 E |
| 1,980,927 | 11/1934 | Parker | 29/420.5 X |
| 2,101,376 | 12/1937 | Vöigtlander | 175/411 X |
| 2,148,925 | 2/1939 | Bochy | 29/401 |
| 2,162,660 | 6/1939 | Weisbecker | 29/401 X |
| 2,293,997 | 8/1942 | Neuhaus | 29/401 |
| 3,227,008 | 1/1966 | Celovsky | 29/401 X |
| 3,280,865 | 10/1966 | Alexander | 144/218 |
| 3,321,145 | 5/1967 | Gorman | 144/162 R |
| 3,344,501 | 10/1967 | Kulzer | 29/401 |
| 3,542,302 | 11/1970 | Salzmann, Jr. | 144/218 X |

OTHER PUBLICATIONS

ASM *Metals Handbook* 8th Ed., vol. 6 © 1971, "Welding & Brazing", pp. 635–639.

Primary Examiner—C.W. Lanham
Assistant Examiner—V. K. Rising
Attorney, Agent, or Firm—Price, Heneveld, Huizenga & Cooper

[57] ABSTRACT

A refurbished knife holder for wood chippers and a method of repairing wear parts are disclosed. The knife holder includes a machined recess and an insert bonded to the holder at the recess and machined to define the surfaces of the holder. The method includes the steps of preparing the wear part and the insert for bonding and bonding the insert to the wear part by an induction heating operation at approximately 1200° F. A silver alloy filler material having approximately 50% silver and a flow point of approximately 1180° F is employed.

5 Claims, 4 Drawing Figures

U.S. Patent  Nov. 29, 1977  Sheet 1 of 2  4,059,884

# WEAR PART

BACKGROUND OF THE INVENTION

This invention relates to wear parts and a method for the repair of wear parts and more particularly to the repair of the wear parts of wood chippers.

Conventional wood chippers for reducing slabs, logs or even entire trees to wood chips generally employ a rotatably mounted cutting disc. The cutting disc is usually formed from a mild steel and may be approximately five inches thick. A plurality of cutting blades or knives are mounted adjacent apertures on the cutting disc to be rotated therewith. The rotating disc is mounted on a base structure and typically includes a wear plate mounted to the face of the disc. The cutting knives which may be from 14 to 28 inches in length are secured to the aperture sides of the disc by a knife holder, counter knife and knife clamp, all of which are bolted directly or indirectly to the rotating disc. A housing surrounds the disc and includes an opening through which the wood to be chipped may be passed. The opening is covered by a spout which terminates in a feed plate adjacent an anvil. During rotation of the disc, the cutting knives are passed adjacent the face of the anvil and at such an angle so as to draw in the raw material to produce wood chips which are expelled through an exhaust chute usually at the periphery of the housing. The wood chips are generally employed in the paper mill industry.

The anvil, the feed plate, the wear plate mounted on the rotating disc, the knife clamp, and the knife holder are all subjected to wear due to the extreme frictional and impact forces incurred during operation. Since close tolerances are involved with respect to the clearance between the stationary and the rotating parts and due to the relatively high rpm at which the massive steel disc rotates, these wear parts must be replaced quite frequently to maintain efficient operation of the chipper.

Due to the relatively high cost of each of these individual wear parts, attempts have been made to repair the worn parts for reuse. Since these wear parts are subject to extreme stresses, are machined for close tolerances with respect to the individual parts to achieve the proper clearances between the rotating and nonrotating parts in order to obtain satisfactory chipping, and the fact that the rotating disc must be kept in balance, prior attempts to repair them have been entirely unsatisfactory.

For example, it has been proposed to manufacture the wear parts with a replaceable mechanically attached wear plate using bolts or other fasteners. Due to the shock loads encountered by the wear parts during use, the bolts generally fail or loosen. This is an extremely dangerous situation since the metal parts may be flung from the cutter or chipper at a high rate of speed resulting in possible injury to operating personnel and destruction of the chipper. Further, the use of mechanical members to attach inserts in the repair of the wear elements has resulted in an imbalancing of the rotating disc, thereby subjecting all parts of the chipper to vibration and subsequent cyclic fatigue.

It has also been proposed to resurface the worn areas by applying a filler material directly to the metal parts as with a metal arc welding process. The weldment was then ground to size. The generally high temperatures involved in an arc welding process have resulted in warpage and twisting of the wear parts. As a result, the attempted repair is totally unsatisfactory in that the necessary tolerances with respect to the wear parts and the necessary clearances in the chipper have not been obtainable.

Finally, attempts have been made to machine a recess in the wear part at the wear area and fill the recess with a mosaic of tungsten carbide inserts. The inserts are brazed at a temperature of 1600° F to the wear parts. This has been an unsatisfactory method of repair with respect to the wear parts of the wood chipper, since the differences in the thermal expansion of the tungsten carbide insert and the base metal of the wear part have resulted in warpage and twisting of the part upon the attempt to repair it. In both of the latter efforts, the wood chippers either exploded or would not operate properly.

It is, therefore, readily apparent that all prior attempts to repair or resurface the wear parts found in wood chippers have been totally unsuccessful due to the exacting manufacturing tolerances involved, the close clearances between the rotating and nonrotating parts, the necessity of maintaining the cutting disc in balance and the fact that all prior methods attempted have resulted in twisting or warpage of the wear parts.

SUMMARY OF THE INVENTION

In accordance with the present invention, improved refurbished wear parts of wood chippers are provided. Essentially, the wear part is first machined to remove material from the worn area and form a recess. An insert is formed from a material having a coefficient of expansion substantially equal to that of the wear part. The insert is then cut and ground to fit the formed recess. The surfaces of the insert and the machined area are then prepared for brazing with a silver solder or equivalent filler alloy metal. The insert is then positioned within the recess and the wear part is heated to a temperature of approximately 1200° F to braze the insert in the recess. The repaired part is then cooled and the insert and the interface edges machined so that the part assumes its original tolerances.

The resultant repaired wear part is readily usable at a substantially lower cost than would be encountered if the part were replaced with a new one. There is thus provided a repaired wear part of a chipper having wearability at least equal to an original wear part, a method for bonding inserts of a hard surfaced material having a coefficient of expansion substantially the same as the wear part to the wear part; and a method by which wear parts of wood chippers may be repaired accurately, easily and with none of the problems heretofore experienced with the prior methods.

The features, advantages and objects of the present invention can best be understood by reference to the following description thereof together with the accompanying drawings in which:

DETAILED DESCRIPTION OF THE PREFERRED EMBODIMENT

Figure 1:
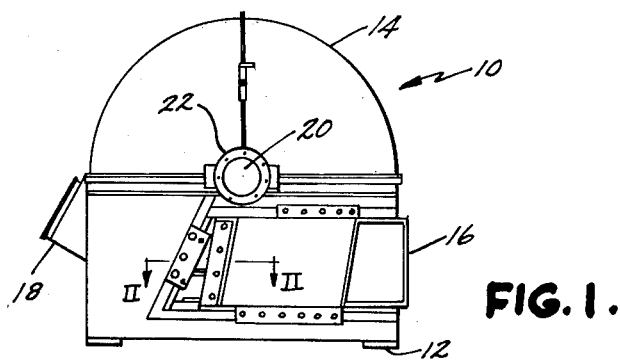
FIG. 1 is a front elevation of a wood chipper of the type including wear parts which form the subject of the present invention.
Figure 2:
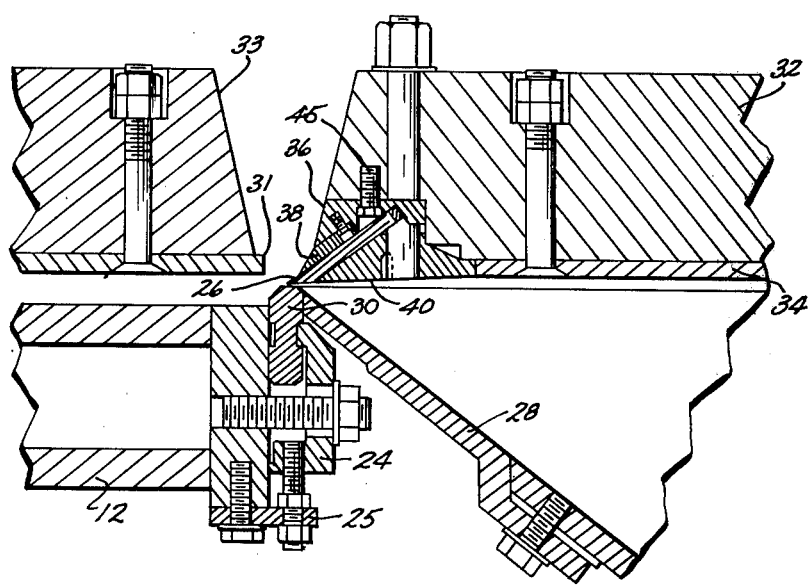
FIG. 2 is a fragmentary enlarged cross section taken generally along section line II—II of FIG. 1.

A typical wood chipper employing wear parts repairable in accordance with the method of the subject invention is shown in FIG. 1 and generally designated 10. As shown, the wood chipper 10 includes a base 12, a protective housing 14 including an inlet chute 16 and an exhaust chute 18. A steel chipper disc 32 (FIG. 2) is secured to a shaft 20. The shaft 20 is rotatably supported within a pair of spaced journal bearings 22. The wood to be chipped enters the machine through the inlet 16 and as best seen in FIG. 2, abuts a vertical anvil 30 supported by an anvil clamp 24 and keeper plate 25. A feed plate 28 extends from the inlet 16 and abuts the vertical anvil 30. The rotating steel disc 32 has a disc-shaped wear plate 34 bolted to one face thereof. Disc 32 and plate 34 each include apertures 31 and 33, respectively, having configurated edge surfaces and tapered outwardly from the front to the back of the chipper to permit wood chips to pass through the chipper disc and plate.

An arrangement including a knife holder 36, a counter knife 38 and a knife clamp 40 is secured by suitable bolts to the disc 32 adjacent apertures 31 and 33 and serves to retain the knives 26 in position.

In operation, the disc 32 of the wood chipper illustrated in FIGS. 1 and 2 is rotated at approximately 850 revolutions per minute by a suitable engine (not shown) coupled to drive shaft 22 to which disc 32 is secured. As the wood is fed into chute 16 and abuts anvil 30, the knives slice chips from the end of the wood which are expelled through apertures 31 and 33 and finally from the chipper through chute 18 for collection. During operation, due to the severe pounding and forces including frictional and impact, the areas immediately adjacent the knives and which come into contact with the wood suffer rapid wear. These wear areas are identified in FIG. 2 by darkened areas. As shown, the feed plate 28, the vertical anvil 30, the spout 16 and the knife clamp 40 are all subject to wear adjacent the entrance point to the cutter. The wear plate 34, the counter knife 38, and the knife holder 36 are all subject to wear adjacent the entrance to the chip slot or aperture 31 formed in the disc 32.

The angle which the knives 26 assume relative to the anvil 30 and the feed spout 16 is critical for proper operation of the machine. Further, the clearance between the tip of the knife and the face of anvil 30 is also critical. The knives employed in this type of wood chipper are generally fourteen to twenty-eight inches in length depending on the overall size of the chipper. As the knife holder 36 wears adjacent the inlet to the chip slots (31, 33), the tip portion which abuts the counter knife 38 has a tendency to peel backwards into the chip slot. As a result, dirt, sand and wood chips are able to enter the area between the face of the knife holder 36 and the counter knife as well as other areas between the knife clamp 40 and the knife 26. As the wood chips build up in these areas, the knife may be forced outwardly in the direction of the anvil 30 ultimately resulting in the knife striking the anvil causing serious damage to the wood chipper. As a result, an inspection of the wear parts of the wood chipper must be made prior to each operation of the device. If the parts have worn past acceptable limits, they must be replaced. Replacement with original equipment parts is very costly since the knife holder alone may cost in excess of several hundred dollars. Due to the fact that heretofore no acceptable method was available to repair these parts, they were generally discarded.

Figure 3:
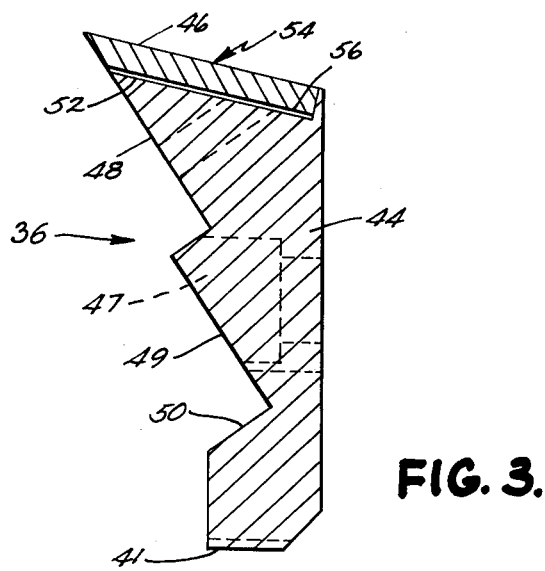
FIG. 3 is an enlarged cross sectional view of a knife holder of the present invention and repaired in accordance with the method of the present invention.

The description of the present invention will be primarily directed to a repaired knife holder 36 (FIG. 3), although the invention is applicable to the remaining wear parts in the wood chipper as well as other metal parts which are subject to wear. As shown in FIG. 3, the knife holder 36 includes a vertical surface 44 which abuts the disc 32, an outer surface 46, a notched counter knife support surface 48 and knife support surfaces 49 and 50. The outer surface 46 is the surface primarily subject to wear during operation of the wood chipper. The holder also includes a plurality of spaced apertures 47 for receiving bolts 45 securing the holder to disc 32 as seen in FIG. 2. The bottom surface 41 of the holder abuts against the notched area of disc 32 adjacent chip slot 33 as seen in FIG. 2.

The repaired knife holder 36 includes a machined recess 52 within which is disposed an insert 54. The insert may be formed from the same material as that employed in forming the knife holder 36. Typically, a mild steel is employed such as SAE 1020 or 1040 steel. It is preferred, however, that the insert be formed from a hard surfaced material such as case hardened steel, having a coefficient of expansion substantially equal to that of the disc material. The repaired holder will then possess a usable life in excess of the original equipment holder.

As more fully described below, the insert 54 and the knife holder recess 52 are prepared so that coalescence between the insert 54 and the knife holder 36 may be accomplished through induction brazing. A silver alloy filler metal 56 having a melting point lower than the melting point of the base metal employed in the steel insert and the knife holder is interposed therebetween for bonding the insert within the recess of the holder. The counter knife support surface 48 and the outer surface 46 then are machined so that the dimensions of the repaired knife holder 36 are the same as that of the original equipment holder.

Figure 4:
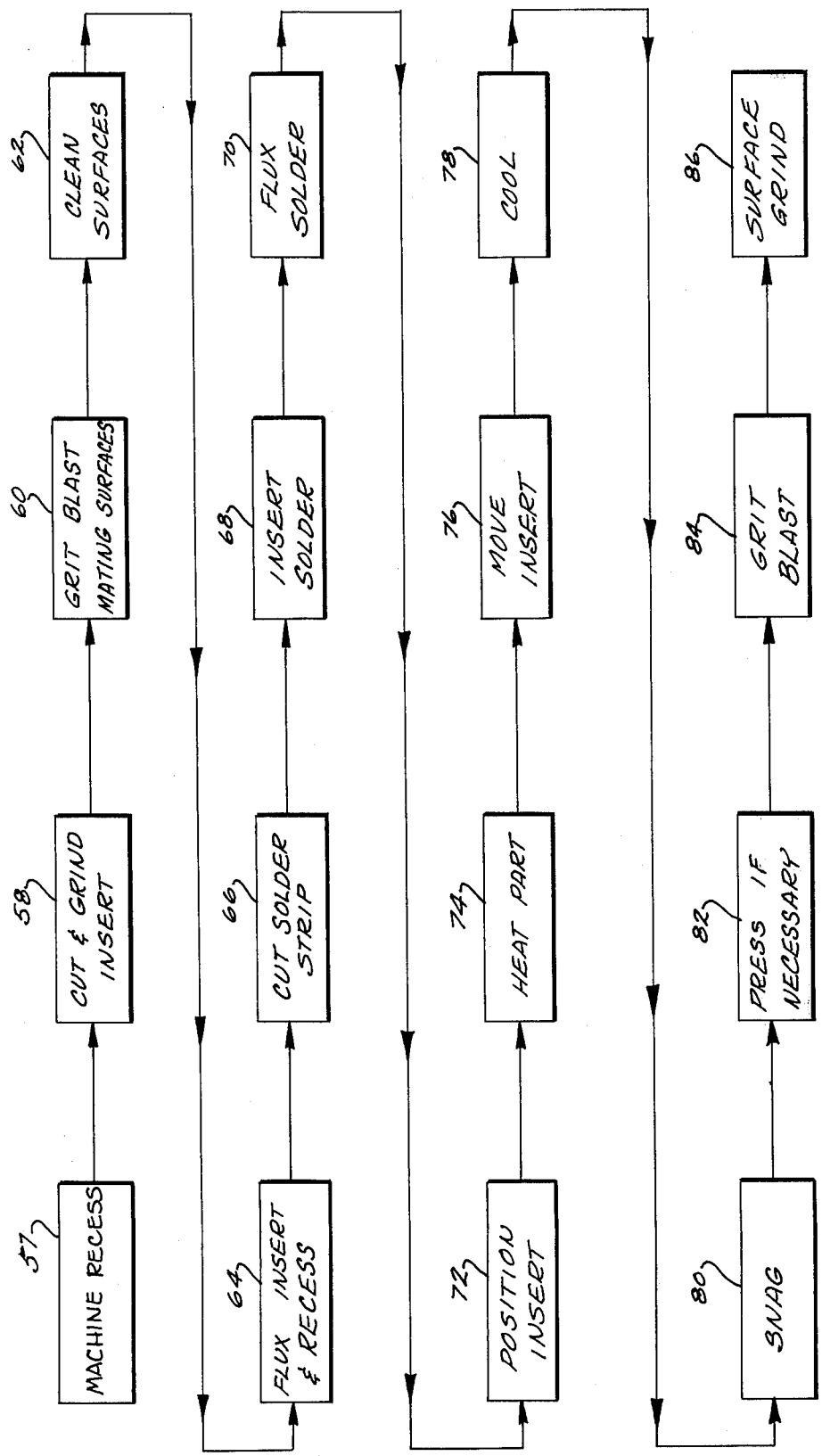
FIG. 4 is a flow diagram in block form showing the process employed to manufacture the wear part shown in FIG. 3.

In the first step of the process in accordance with the present invention, the wear part 36 is machined along its outer surface to form the recess 52. In machining out material from the worn area of the holder 36, the amount of metal which must be removed will vary depending upon the size of the knife holder and the amount of wear to which it has been subject. Next, the insert, formed from a mild, low carbon or case hardened steel of the same general type as that employed with the disc 36, is cut and ground to size. These steps are designated 57 and 58, respectively, in FIG. 4. On cutting the inserts, the thickness generally may vary from $\frac{1}{8}$ of an inch to $\frac{1}{4}$ of an inch and the width from 1 inch up to $2\frac{1}{2}$ inches. The length of the insert will be slightly longer than the length of the knife holder 36. The insert must assume a slip fit with the recess. The next step 60 involves grit blasting the mating surfaces of the insert 54 and the machined out recess 52. This grit blasting operation preferably employs conventional abrasives such as commercially available 46/70 WSC silicon carbide applied under 100–140 psi. This step provides a larger surface area to effect bonding of the insert to the knife holder. After the grit blasting, the mating surfaces are cleaned with a solution of trichloroethylene and then dried using a stream of pressurized air as indicated at 62. Next, a commercially available, high temperature black flux which comes in paste form is applied to the mating surfaces of the insert and recess as indicated at step 64. The flux is employed to dissolve oxides as well as to clean the metal surfaces.

Next, the silver alloy filler metal or solder 56 is cut to fit the area of the recess 52. Any readily available commercial silver solder alloy filler material may be employed. It is preferred, however, that the solder contain approximately 50% silver and have a melting point of approximately 1120° F and a flow point of approximately 1180° F. The solder is available as rolled sheet stock and is readily cut to size. The solder cutting step is 66 in FIG. 4.

Next, as indicated at step 68, the solder is laid within the recess 52 on top of the black flux. Next, as indicated at 70, the black flux is spread over the top of the solder within the recess. Next, the cut and ground insert 54 is positioned within the prepared recess 52, as indicated at step 72. The prepared insert and knife holder are then disposed within the coil of an induction furnace to supply the necessary energy to raise the temperature of the insert, silver alloy filler metal and the knife holder. This induction heating step of the parts, as indicated at 74, employs a low frequency, large coil induction furnace. In one embodiment of the invention, a commercially available 50 kilowatt TOCO furnace was successfully employed with 20–24 inch wear parts totally within the induction coil. By controlling the current through the induction coil and/or the time within the coil, distortion of the knife holder during the repair process is substantially eliminated. The knife holder is heated to a temperature of approximately 1200° F to ensure flow of the silver alloy filler metal for a period of 1 to 2 minutes. The use of an insert formed from a surface hardened steel having a coefficient of expansion substantially equal to that of the disc material eliminates uncorrectable warpage or twisting of the holder during the heating operation and the surface hardened insert has greater wear resistance than the holder base metal.

Either during the operation of the induction furnace or immediately thereafter, as indicated at step 76, the insert should be moved slightly within the recess to ensure adequate and complete wetting of the interface between the insert and the knife holder by the silver alloy metal filler. Next, as indicated at step 78, the repaired knife holder is removed from the induction furnace and cooled. This cooling operation preferably is accomplished while holding the insert down with slight or finger pressure.

Once the repaired knife holder is cooled to room temperature, the ends of the insert are cut to length by snagging 80. Next, as indicated at 82, the repaired knife holder may be placed within a 200 ton press in the event that any slight distortion occurred during the brazing operation. Such an operation is capable of correcting up to 1/64 of an inch of distortion which is minimal as compared to the excessive warping and twisting which occurs in the prior art processes.

Finally, as indicated at steps 84 and 86, respectively, the surfaces of the insert are grit blasted and the outer surface and interface sides of the insert and the knife holder are ground at 84. The resulting repaired knife holder has dimensions within the tolerances allotted for a new part. The overall process permits the repairing of the knife holder without unacceptable distortions and/or twisting. It has been found that the repaired article in fact has an increased life when compared with the original part. Substantial savings are encountered for users of wood chippers of the type described since it is no longer necessary for them to discard the worn part and replace it with an expensive new knife holder.

It can, therefore, be seen that the products of and process of the subject invention substantially alleviate all of the problems heretofore experienced with the repair of wearable items. Since warpage and twisting are eliminated, it is not necessary to perform extensive machining upon the part which would generally result in the part becoming undersized in critical areas so that it cannot be used. It is expressly intended that the foregoing description is illustrative of the preferred embodiment only and is not to be considered limiting. The true spirit and scope of the present invention will be determined by reference to the appended claims.

The embodiments of the invention in which an exclusive property or privilege is claimed are defined as follows:

1. A method of repairing the wear parts of a wood chipper such as a knife holder, comprising the steps of:
   removing material from the worn area of the wear part to form a recess;
   forming an insert from a material having a coefficient of thermal expansion substantially equal to that of the material of the wear part, said insert dimensioned to fit within the recess;
   fluxing the recess;
   positioning a silver alloy filler in the recess;
   positioning the insert within the recess;
   induction heating the wear part and insert so that bonding occurs by brazing between the wear part and insert, said insert being formed from a surface hardened steel, said fluxing step employing a high temperature, paste form black flux;
   grit blasting the mating surfaces of said insert and said recess prior to fluxing the recess, said silver alloy filler material containing approximately 50% silver and having a flow point of approximately 1120° F, said induction heating step including heating at a temperature of approximately 1200° F for a period of at least one minute; and
   moving said insert once said heating step is started to insure wetting of the mating surfaces.

2. A method as defined by claim 1 further comprising the steps of cleaning the mating surfaces of the insert and recess after the grit blasting step; and
   drying the mating surfaces.

3. A method as defined by claim 2 further comprising the steps of:
   cooling the insert and wear part after the heating step; and
   clamping the insert to the wear part with light pressure during said cooling step.

4. A method as defined by claim 3 including the additional step of machining the surfaces of the insert so that the repaired part assumes its original tolerances.

5. A method as defined by claim 4 including the additional step of machining the interface between the insert and the wear part at the ends of the wear part.

* * * * *